United States Patent
Sumiya et al.

(10) Patent No.: US 6,926,847 B2
(45) Date of Patent: Aug. 9, 2005

(54) SINGLE CRYSTALS OF SILICATES OF RARE EARTH ELEMENTS

(75) Inventors: Keiji Sumiya, Tsukuba (JP); Hiroyuki Ishibashi, Hitachinaka (JP); Nachimuthu Senguttuvan, Tsukuba (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 122 days.

(21) Appl. No.: 10/621,350

(22) Filed: Jul. 18, 2003

(65) Prior Publication Data

US 2004/0021129 A1 Feb. 5, 2004

(30) Foreign Application Priority Data

| Jul. 30, 2002 | (JP) | ........................................ | 2002-221536 |
| Jul. 30, 2002 | (JP) | ........................................ | 2002-221537 |
| Jul. 30, 2002 | (JP) | ........................................ | 2002-221538 |

(51) Int. Cl.$^7$ .................. G10T 1/202; C30B 15/04; C30B 15/26; C30B 29/34
(52) U.S. Cl. ................ 252/301.4 F; 117/942
(58) Field of Search .................. 117/942; 252/301.4 F, 252/301.16

(56) References Cited

U.S. PATENT DOCUMENTS 5,728,213 A * 3/1998 Kurata et al. ............... 117/19

FOREIGN PATENT DOCUMENTS

| JP | 63-307381 | 12/1988 |
| JP | 01-65481 | 3/1989 |

* cited by examiner

Primary Examiner—C. Melissa Koslow
(74) Attorney, Agent, or Firm—Westerman Hattori Daniels & Adrian, LLP

(57) ABSTRACT

A single crystal of a silicate of a rare earth element herein provided is characterized in that it has a Ce concentration of not less than 0.6 mole % and not more than 5 mole % and that it has a light transmittance, as determined at a wavelength of 450 nm, of not less than 75%. The single crystal permits the solution of the problems associated with the conventional techniques or the problems concerning the coloration of the resulting single crystal and the reduction of the light transmittance thereof, which are disadvantages observed when the Ce concentration of the single crystal is increased to reduce the fluorescence-attenuation time. The single crystal thus permits the high-speed diagnosis of PET devices.

7 Claims, No Drawings

SINGLE CRYSTALS OF SILICATES OF RARE EARTH ELEMENTS

BACKGROUND OF THE INVENTION

The present invention relates to a single crystal of a silicate of a rare earth element, which may be used in, for instance, a scintillator for PET devices, and the scintillator using the same.

A single crystal of a silicate of a rare earth element such as a single crystal of gadolinium silicate has widely been used in a variety of fields such as scintillators and fluorescence materials (phosphors). Such a single crystal of, for instance, gadolinium silicate is prepared from an oxide of a rare earth element such as gadolinium oxide and a silicon oxide such as silicon dioxide as raw materials according to, for instance, the Czochralski method in which a single crystal is grown from a melt containing raw materials. Moreover, such a single crystal of a silicate of a rare earth element is in general doped with an additive such as Ce, which serves as a fluorescent center in the resulting single crystal. It is believed that rare earth elements other than constitutive elements and impurities such as transition metals have an influence on scintillator performances such as fluorescence-attenuation time and therefore, raw materials having a purity of not less than 99.99% by mass such as $Gd_2O_3$ and $SiO_2$ from which impure elements have been reduced are used to grow crystals.

When using a conventional single crystal of a silicate of a rare earth element such as that of gadolinium silicate as a scintillator, the luminescence-attenuation curve thereof comprises two components or a rapidly attenuating component (Fast Component) appearing in the range of from 30 to 60 ns and a slowly attenuating component (Slow Component) appearing in the range of from 400 to 600 ns. In this connection, the output ratio (or the existing ratio) of the rapidly attenuating component (Fast Component) to the slowly attenuating component (Slow Component) was found to be on the order of about 70 to 80%: 30 to 20%. For this reason, in case of the scintillator for PET (Positron Emission Computed Tomography Device) whose fluorescence-attenuation time should be reduced, it has been desired to accelerate only the slowly attenuating component (Slow Component) in the luminescence-attenuation curve and to thus reduce the output ratio (or the existing ratio), without impairing other characteristic properties required for such a scintillator. As an example of a means for shortening the fluorescence-attenuation time, there has been known a method in which Ce as a dopant is incorporated into a single crystal for use in the preparation of such a scintillator in an amount higher than that used in the conventional technique.

In a gadolinium silicate single crystal in which the concentration of Ce serving as the fluorescent center is not less than 0.6 mole %, however, the resulting single crystal is dyed in pale yellow. Such coloration is not preferred since it may deteriorate the fluorescent output and the energy resolution and accordingly, it may impair the characteristic properties of the resulting scintillator. This coloration may be caused due to the presence of tetravalent Ce atoms, which do not have any contribution to the luminescence. Accordingly, it would be necessary to devise a measure to reduce the concentration of tetravalent Ce atoms, which may cause the foregoing coloration, while ensuring the reduction of the fluorescence-attenuation time by maintaining a high concentration of Ce, in order to develop a method for simultaneously allowing the shortening of the fluorescence-attenuation time and the maintenance of a high fluorescent output.

SUMMARY OF THE INVENTION

Accordingly, it is an object of the present invention to provide a single crystal of a silicate of a rare earth element in which the slowly attenuating component (Slow Component) is reduced and the fluorescence-attenuation time is shortened.

It is another object of the present invention to provide a single crystal of a silicate of a rare earth element, which is scarcely colored even in a Ce concentration range higher than that used in the conventional technique or at a Ce concentration, which may entrain the coloration of the resulting single crystal in pale yellow, which permits the reduction of the fluorescence-attenuation time and which can contribute to the improvement of the resulting scintillator for PET in the operating speed.

According to the present invention, there are provided the following single crystal of a silicate of a rare earth element and a scintillator.

1. A single crystal of a silicate of a rare earth element wherein the crystal contains aluminum in an amount of higher than 0.4 ppm and not more than 50 ppm and/or iron in an amount of higher than 0.1 ppm and not more than 50 ppm.
2. The single crystal of a silicate of a rare earth element of the above item 1, wherein the crystal contains cerium in an amount of not less than 0.6 mole % and not more than 5 mole % and that it has a light transmittance, as determined at a wavelength of 450 nm, of not less than 75%.
3. The single crystal of a silicate of a rare earth element of the above item 1 or 2, wherein the crystal contains aluminum in an amount of higher than 0.4 ppm and not more than 50 ppm.
4. The single crystal of a silicate of a rare earth element of the above item 1 or 2, wherein the crystal contains iron in an amount of higher than 0.1 ppm and not more than 50 ppm.
5. The single crystal of any one of the above items 1 to 4, wherein the rare earth element is gadolinium.
6. The single crystal of any one of the above items 1 to 5, wherein the crystal is cerium-doped gadolinium silicate.
7. A scintillator which comprises the single crystal of any one of the above items 1 to 6.
8. A single crystal of a silicate of a rare earth element wherein the crystal contains cerium in an amount of not less than 0.6 mole % and not more than 5 mole % and that the crystal has a light transmittance, as determined at a wavelength of 450 nm, of not less than 75%.
9. The single crystal of a silicate of a rare earth element of the above item 8, wherein the crystal contains aluminum in an amount of higher than 0.4 ppm and not more than 50 ppm.
10. The single crystal of the above item 8 or 9, wherein the rare earth element is gadolinium.
11. A scintillator which comprises the single crystal of any one of the above items 8 to 10.

DESCRIPTION OF THE PREFERRED EMBODIMENTS

The inventors of this invention have variously investigated the relationships between the two components of the luminescence-attenuation curve, that is, a rapidly attenuating component (Fast Component) and a slowly attenuating component (Slow Component) and the output ratio (or the existing ratio) of the two components and impurities content in raw materials (the single crystals of rare earth metal silicates) and found that properties of grown single crystals are influenced by specific impure elements in the raw materials. Based on this finding, they have completed the present invention. That is, they have found that the incorporation of aluminum (Al) in an amount of higher than 0.4 ppm and not more than 50 ppm and/or iron in an amount of higher than 0.1 ppm and not more than 50 ppm into a single crystal of rare earth metal silicate can reduce the slowly attenuating component (Slow Component) and shorten the fluorescence-attenuation time to thereby improve the scintillator properties.

It is necessary that the amount of aluminum contained in the single crystal of a silicate of a rare earth element (hereunder referred to as "rare earth metal silicate(s)") of the present invention is higher than 0.4 ppm and not more than 50 ppm, preferably 5 to 40 ppm, most preferably 10 to 30 ppm.

If the amount of aluminum is not higher than 0.4 ppm, the slowly attenuating component (Slow Component) is not reduced and the fluorescence-attenuation time is not shortened. On the other hand, if the amount of aluminum is higher than 0.4 ppm, the slowly attenuating component (Slow Component) is reduced and the fluorescence-attenuation time is shortened. However, if the amount of aluminum is more than 50 ppm, the fluorescent output is rapidly reduced. For the above reasons, it is necessary that the amount of impurity, aluminum is higher than 0.4 ppm and not more than 50 ppm.

It is necessary that the amount of iron (Fe) contained in the single crystal of rare earth metal silicate of the present invention is higher than 0.1 ppm and not more than 50 ppm, preferably 5 to 40 ppm, most preferably 10 to 30 ppm.

If the amount of iron is not higher than 0.1 ppm, the slowly attenuating component (Slow Component) is not reduced and the fluorescence-attenuation time is not shortened. On the other hand, if the amount of aluminum is higher than 0.1 ppm, the slowly attenuating component (Slow Component) is reduced and the fluorescence-attenuation time is shortened. However, if the amount of iron is more than 50 ppm, the fluorescent output is rapidly reduced. For the above reasons, it is necessary that the amount of impurity, iron is higher than 0.1 ppm and not more than 50 ppm.

The amount of cerium (Ce) in a single crystal of rare earth metal silicate of the present invention is preferably not less than 0.6 mole % and not more than 5 mole % and that the light transmittance as determined at a wavelength of 450 nm is preferably not less than 75%. The amount of Ce to be added to the single crystal more preferably ranges from 1 to 3 mole % and most preferably 1.5 to 2 mole %. In this connection, the content of Al in the rare earth metal silicate single crystal to which Ce is doped in an amount of 0.6 to 5 mole % is preferably adjusted to a level of higher than 0.4 ppm and not less than 50 ppm to obtain a single crystal having desired characteristic properties such as those specified above.

If the content of Al as an impurity is not more than 0.4 ppm, the coloration of the resulting single crystal cannot be inhibited at all, the single crystal is dyed in pale yellow and the light transmittance thereof is likewise impaired. On the other hand, if the content of Al as an impurity exceeds 50 ppm, voids are formed within the resulting single crystal and this in turn results in the reduction of the light transmittance of the crystal. This would be caused due to an increase of fine foreign phases formed within, for instance, the resulting gadolinium silicate single crystal. However, it would be recognized that if the Ce concentration is high on the order of not less than 0.6 mole %, the formation of any foreign phase is inhibited and thus any void is not formed even when Al as an impurity is present in an amount of higher than 0.4 ppm and not more than 50 ppm.

In the present invention, the content of Al as an impurity should be controlled to a level of higher than 0.4 ppm and not more than 50 ppm. The Al content more preferably ranges from 2 to 30 ppm and most preferably 5 to 20 ppm.

The rare earth metal silicate single crystal of the present invention can in general be represented by the following general formula: $Ln_{2-x}Ce_xSiO_5$ wherein Ln represents at least one element selected from the group consisting of Sc, Y, La, Ce, Pr, Nd, Pm, Sm, Eu, Tb, Dy, Ho, Er, Tm, Yb and Lu and x represents a numerical value ranging from 0 to 2 and would give the same results observed for the gadolinium silicate single crystal discussed above. The foregoing rare earth metal silicate single crystals of the present invention have crystalline structures identical to that observed for the gadolinium silicate single crystal and the symmetry elements of the structures thereof belong to the space group P21/c.

The present invention will now be described in more detail with reference to the following Examples and Comparative Examples, but the present invention is not restricted to these specific Examples at all.

EXAMPLES A

In the following Examples A and Comparative Examples A, single crystals were grown or prepared according to the Czochralski method using, as raw materials, gadolinium oxide ($Gd_2O_3$, 99.99% by mass), silicon dioxide ($SiO_2$, 99.99% by mass), cerium oxide ($CeO_2$, 99.99% by mass) and aluminum oxide ($Al_2O_3$, 99.99% by mass). A specimen having a size of $10\times10\times10$ mm$^3$ was taken from each single crystal thus prepared and the fluorescence-attenuation curve, the fluorescence-attenuation time, the existing ratio of fluorescence output were obtained from an energy spectrum ($^{137}$Cs) and a digital oscillography of the scintillator. The results thus obtained are summarized in the following Table 1. In each Example, three single crystals were grown and in Table 1, each datum was thus the average of three measurements. These examples are shown to illustrate the present invention but not to limit the invention.

EXAMPLE A1

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.0075 g of aluminum oxide followed by admixture of these ingredients together, firing of the resulting mixture at a temperature of 1200° C. and introduction of the fired mixture in an iridium (Ir) crucible having a diameter of 100 mm. Then a single crystal was grown under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a single crystal having a diameter of 50 mm was obtained. The Al concentration in the single crystal thus prepared was determined by the inductively coupled plasma (ICP) mass spectrometry and as a result, it was found to be 0.6 ppm.

EXAMPLE A2

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.3 g of aluminum oxide followed by admixture of these ingredients together, firing of the resulting mixture at a temperature of 1200° C. and introduction of the fired mixture in an Ir crucible having a diameter of 100 mm. Then a single crystal was grown under the following crystal growth conditions: a temperature of the melt of 1950° C., a rotational number of the seed crystal of 30 rpm and a pulling rate of 2 mm/hr. The pulling operation was continued till 80% by mass of the raw material was crystallized. Thus, a single crystal having a diameter of 50 mm was obtained. The Al concentration in the single crystal thus prepared was determined by the inductively coupled plasma (ICP) mass spectrometry and as a result, it was found to be 24 ppm.

EXAMPLE A3

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.5625 g of aluminum oxide followed by admixture of these ingredients together, firing of the resulting mixture at a temperature of 1200° C. and introduction of the fired mixture in an iridium crucible having a diameter of 100 mm. Then a single crystal was grown under the following crystal growth conditions: a temperature of the melt of 1950° C., a rotational number of the seed crystal of 30 rpm and a pulling rate of 2 mm/hr. The pulling operation was continued till 80% by mass of the raw material was crystallized. Thus, a single crystal having a diameter of 50 mm was obtained. The Al concentration in the single crystal thus prepared was determined by the inductively coupled plasma (ICP) mass spectrometry and as a result, it was found to be 45 ppm.

COMPARATIVE EXAMPLES A

Comparative Examples A will hereunder be described while taking a gadolinium silicate single crystal having a Ce concentration of 0.48 mole % by way of example like the foregoing Examples A. Single crystals were grown according to the Czochralski method using, as raw materials, gadolinium oxide ($Gd_2O_3$, 99.99% by mass), silicon dioxide ($SiO_2$, 99.99% by mass), cerium oxide ($CeO_2$, 99.99% by mass), and aluminum oxide $Al2O_3$, 99.99% by mass), which were completely identical to those used in the foregoing Examples A (the purification lot numbers were also identical). A specimen having a size of 10×10×10 $mm^3$ was taken from each single crystal thus prepared and the fluorescence-attenuation curve, the fluorescence-attenuation time, the existing ratio of the attenuating components (Fast Component/Slow Component) and the fluorescence output were obtained from an energy spectrum ($^{137}Cs$) and a digital oscillography of the scintillator. The results thus obtained are summarized in the following Table 1. In each Comparative Example A, three single crystals were grown and in Table 1, each datum was thus the average of three measurements.

COMPARATIVE EXAMPLE A1

A gadolinium silicate single crystal having a Ce concentration of 0.48 mole % was prepared as follows. There were weighed out 2573.5 g of gadolinium oxide, 426.5 g of silicon dioxide and 5.9 g of cerium oxide followed by admixture of these ingredients together, firing of the resulting mixture at a temperature of 1200° C. and introduction of the fired mixture in an iridium crucible having a diameter of 100 mm. Then a single crystal was grown under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a single crystal having a diameter of 50 mm was obtained. The Al concentration in the single crystal thus prepared was determined by the inductively coupled plasma (ICP) mass spectrometry and as a result, it was found to be 0 ppm.

COMPARATIVE EXAMPLE A2

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.0025 g of aluminum oxide followed by admixture of these ingredients together, firing of the resulting mixture at a temperature of 1200° C. and introduction of the fired mixture in an iridium crucible having a diameter of 100 mm. Then a single crystal was grown under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a single crystal having a diameter of 50 mm was obtained. The Al concentration in the single crystal thus prepared was determined by the inductively coupled plasma (ICP) mass spectrometry and as a result, it was found to be 0.2 ppm.

COMPARATIVE EXAMPLE A3

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.65 g of aluminum oxide followed by admixture of these ingredients together, firing of the resulting mixture at a temperature of 1200° C. and introduction of the fired mixture in an iridium crucible having a diameter of 100 mm. Then a single crystal was grown under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a single crystal having a diameter of 50 mm was obtained. The Al concentration in the single crystal thus prepared was determined by the inductively coupled plasma (ICP) mass spectrometry and as a result, it was found to be 52 ppm.

COMPARATIVE EXAMPLE A4

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.875 g of aluminum oxide followed by admixture of these ingredients together, firing of the resulting mixture at a temperature of 1200° C. and introduction of the fired mixture in an iridium crucible having a diameter of 100 mm.

Then a single crystal was grown under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a single crystal having a diameter of 50 mm was obtained. The Al concentration in the single crystal thus prepared was determined by the inductively coupled plasma (ICP) mass spectrometry and as a result, it was found to be 70 ppm.

TABLE 1

| Items | Al Conc. (ppm) | Fluorescence-attenuation time (ns) | Existing ratio of attenuating components (Fast/Slow) | Fluorescence output (Relative ratio) |
|---|---|---|---|---|
| Ex. A1 | 0.6 | 49 | 89/11 | 90 |
| Ex. A2 | 24 | 47 | 91/9 | 82 |
| Ex. A3 | 45 | 47 | 91/9 | 80 |
| Comp. Ex. A1 | 0 | 68 | 79/21 | 100 |
| Comp. Ex. A2 | 0.2 | 66 | 80/20 | 98 |
| Comp. Ex. A3 | 52 | 45 | 93/7 | 60 |
| Comp. Ex. A4 | 70 | 40 | 96/4 | 51 |

As will be clear from the data obtained in Comparative Examples A1 and A2, when Al concentration is low, the slow attenuating component (Slow component) is not reduced and the fluorescence-attenuation time is not shortened. On the other hand, in Examples A1 to A3 in which Al, concentration is higher than 0.4 ppm, the existing ratio of the slow attenuating component (Slow component) is reduced and as a result, the fluorescence-attenuation time is greatly shortened. However, as seen from Comparative Examples A3 and A4, when Al concentration is higher than 50 ppm, the fluorescence-attenuation time is greatly shortened but the fluorescence output is rapidly reduced and as a result, scintillator properties are deteriorated.

The results show that it is possible to shorten the fluorescence-attenuation time while keeping scintillator properties by the presence of Al as an impurity in an amount of more than 0.4 ppm and not more than 50 ppm, as a result, it is possible to conduct a high-speed diagnosis by a PET device using the scintillator.

EXAMPLES B

In the following Examples B and Comparative Examples B, single crystals were grown or prepared according to the Czochralski method using, as raw materials, gadolinium oxide ($Gd_2O_3$, 99.99% by mass), silicon dioxide ($SiO_2$, 99.99% by mass), cerium oxide ($CeO_2$, 99.99% by mass) and iron (III) oxide ($Fe_2O_3$, 99.99% by mass). A specimen having a size of 10×10×10 $mm^3$ was taken from each single crystal thus prepared and the fluorescence-attenuation curve, the fluorescence-attenuation time, the existing ratio of the attenuating components (Fast Component/Slow Component) and the fluorescence output were obtained from an energy spectrum ($^{137}Cs$) and a digital oscillography of the scintillator. The results thus obtained are summarized in the following Table 2. In each Example, three single crystals were grown and in Table 2, each datum was thus the average of three measurements. These examples are shown to illustrate the present invention but not to limit the invention.

EXAMPLE B1

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.0038 g of iron (III) oxide followed by admixture of these ingredients together, firing of the resulting mixture at a temperature of 1200° C. and introduction of the fired mixture in an iridium (Ir) crucible having a diameter of 100 mm. Then a single crystal was grown under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a single crystal having a diameter of 50 mm was obtained. The Fe concentration in the single crystal thus prepared was determined by the inductively coupled plasma (ICP) mass spectrometry and as a result, it was found to be 0.3 ppm.

EXAMPLE B2

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.045 g of iron (III) oxide followed by admixture of these ingredients together, firing of the resulting mixture at a temperature of 1200° C. and introduction of the fired mixture in an Ir crucible having a diameter of 100 mm. Then a single crystal was grown under the following crystal growth conditions: a temperature of the melt of 1950° C., a rotational number of the seed crystal of 30 rpm and a pulling rate of 2 mm/hr. The pulling operation was continued till 80% by mass of the raw material was crystallized. Thus, a single crystal having a diameter of 50 mm was obtained. The Fe concentration in the single crystal thus prepared was determined by the inductively coupled plasma (ICP) mass spectrometry and as a result, it was found to be 4.6 ppm.

EXAMPLE B3

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.6 g of iron (III) oxide followed by admixture of these ingredients together, firing of the resulting mixture at a temperature of 1200° C. and introduction of the fired mixture in an iridium crucible having a diameter of 100 mm. Then a single crystal was grown under the following crystal growth conditions: a temperature of the melt of 1950° C., a rotational number of the seed crystal of 30 rpm and a pulling rate of 2 mm/hr. The pulling operation was continued till 80% by mass of the raw material was crystallized. Thus, a single crystal having a diameter of 50 mm was obtained. The Fe concentration in the single crystal thus prepared was determined by the inductively coupled plasma (ICP) mass spectrometry and as a result, it was found to be 48 ppm.

COMPARATIVE EXAMPLE B1

A gadolinium silicate single crystal having a Ce concentration of 0.48 mole % was prepared as follows. There were weighed out 2573.5 g of gadolinium oxide, 426.5 g of silicon dioxide and 5.9 g of cerium oxide followed by admixture of these ingredients together, firing of the resulting mixture at a temperature of 1200° C. and introduction of the fired mixture in an iridium crucible having a diameter of 100 mm. Then a single crystal was grown under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a single crystal having a diameter of 50 mm was obtained. The Fe concentration in the single crystal thus prepared was determined by the inductively coupled plasma (ICP) mass spectrometry and as a result, it was found to be 0 ppm.

COMPARATIVE EXAMPLE B2

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.65 g of iron (III) oxide followed by admixture of these ingredients together, firing of the resulting mixture at a temperature of 1200° C. and introduction of the fired mixture in an iridium crucible having a diameter of 100 mm. Then a single crystal was grown under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a single crystal having a diameter of 50 mm was obtained. The Fe concentration in the single crystal thus prepared was determined by the inductively coupled plasma (ICP) mass spectrometry and as a result, it was found to be 52 ppm.

COMPARATIVE EXAMPLE B3

A gadolinium silicate single crystal having a Ce concentration of 0.48 mole % was prepared as follows. There were weighed out 2573.5 g of gadolinium oxide, 426.5 g of silicon dioxide, 5.9 g of cerium oxide and 0.85 g of Iron (III) oxide followed by admixture of these ingredients together, firing of the resulting mixture at a temperature of 1200° C. and introduction of the fired mixture in an iridium crucible having a diameter of 100 mm. Then a single crystal was grown under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a single crystal having a diameter of 50 mm was obtained. The Fe concentration in the single crystal thus prepared was determined by the inductively coupled plasma (ICP) mass spectrometry and as a result, it was found to be 68 ppm.

TABLE 2

| Items | Fe Conc. (ppm) | Fluorescence-attenuation time(ns) | Existing ratio of attenuating components (Fast /Slow) | Fluorescence output (Relative ratio) |
| --- | --- | --- | --- | --- |
| Ex. B1 | 0.3 | 50 | 89/11 | 91 |
| Ex. B2 | 4.6 | 48 | 91/9 | 87 |
| Ex. B3 | 48 | 46 | 92/8 | 80 |
| Comp. Ex. B1 | 0 | 67 | 78/22 | 100 |
| Comp. Ex. B2 | 52 | 45 | 93/7 | 59 |
| Comp. Ex. B3 | 68 | 41 | 96/4 | 52 |

As will be clear from the data obtained in Comparative Example B1, when Fe concentration is less than 0.1 ppm or not present, the slow attenuating component (Slow component) is not reduced and the fluorescence-attenuation time is not shortened. On the other hand, in Examples B1 to B3 in which Fe concentration is higher than 0.1 ppm, the existing ratio of the slow attenuating component (Slow component) is reduced and as a result, the fluorescence-attenuation time is greatly shortened. However, as seen from Comparative Examples B2 and B3, when Fe concentration is higher than 50 ppm, the fluorescence-attenuation time is greatly shortened but the fluorescence output is rapidly reduced and as a result, scintillator properties are deteriorated.

The results show that it is possible to shorten the fluorescence-attenuation time while keeping scintillator properties by the presence of Fe as an impurity in an amount of more than 0.1 ppm and not more than 50 ppm, as a result, it is possible to conduct a high-speed diagnosis by a PET device using the scintillator.

EXAMPLES C

In the following Examples C and Comparative Examples C, single crystals were grown or prepared according to the Czochralski method using, as raw materials, gadolinium oxide ($Gd_2O_3$, 99.99% by mass), silicon dioxide ($SiO_2$, 99.99% by mass), cerium oxide ($CeO_2$, 99.99% by mass) and aluminum oxide ($Al_2O_3$, 99.99% by mass). A specimen having a size of $10 \times 10 \times 10$ mm$^3$ was taken from each single crystal thus prepared and the light transmittance thereof was determined at a wavelength of 450 nm. Moreover, the appearance of each single crystal was visually observed. The results thus obtained are summarized in the following Table 3. In each Example, three single crystals were grown and in Table 3, each datum was thus the average of three measurements.

EXAMPLE C1

A gadolinium silicate single crystal having a Ce concentration of 1.45 mole % was prepared as follows. There were weighed out 2573.5 g of gadolinium oxide, 426.5 g of silicon dioxide, 17.7 g of cerium oxide and 0.0075 g of aluminum oxide followed by admixture of these ingredients together, firing of the resulting mixture at a temperature of 1200° C. and introduction of the fired mixture in an iridium (Ir) crucible having a diameter of 100 mm. Then a single crystal was grown by the Czochralski method in which a seed crystal was pulled out of the melt of the raw materials under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a slightly pale yellow-colored single crystal was obtained and it had a diameter of 50 mm. In addition, the Al concentration in the single crystal thus prepared was determined by the inductively coupled plasma (ICP) mass spectrometry and as a result, it was found to be 0.5 ppm.

EXAMPLE C2

A gadolinium silicate single crystal having a Ce concentration of 1.45 mole % was prepared as follows. There were weighed out 2573.5 g of gadolinium oxide, 426.5 g of silicon dioxide, 17.7 g of cerium oxide and 0.15 g of aluminum oxide followed by admixture of these ingredients together, firing of the resulting mixture at a temperature of 1200° C. and introduction of the fired mixture in an Ir crucible having a diameter of 100 mm. Then a single crystal was grown by the Czochralski method in which a seed crystal was pulled out of the melt of the raw materials under the following crystal growth conditions: a temperature of the melt of 1950° C., a rotational number of the seed crystal of 30 rpm and a pulling rate of 2 mm/hr. The pulling operation was continued till 80% by mass of the raw material was crystallized. Thus, a colorless, transparent single crystal was obtained and it had a diameter of 50 mm. In addition, the Al concentration in the single crystal thus prepared was determined by the inductively coupled plasma (ICP) mass spectrometry and as a result, it was found to be 14 ppm.

EXAMPLE C3

A gadolinium silicate single crystal having a Ce concentration of 1.45 mole % was prepared as follows. There were weighed out 2573.5 g of gadolinium oxide, 426.5 g of silicon dioxide, 17.7 g of cerium oxide and 0.5625 g of aluminum oxide followed by admixture of these ingredients together, firing of the resulting mixture at a temperature of 1200° C. and introduction of the fired mixture in an iridium crucible having a diameter of 100 mm. Then a single crystal was grown by the Czochralski method in which a seed crystal was pulled out of the melt of the raw materials under the following crystal growth conditions: a temperature of the melt of 1950° C., a rotational number of the seed crystal of 30 rpm and a pulling rate of 2 mm/hr. The pulling operation was continued till 80% by mass of the raw material was crystallized. Thus, a colorless, transparent single crystal was obtained and it had a diameter of 50 mm. In addition, the Al concentration in the single crystal thus prepared was determined by the inductively coupled plasma (ICP) mass spectrometry and as a result, it was found to be 47 ppm.

EXAMPLE C4

A gadolinium silicate single crystal having a Ce concentration of 1.93 mole % was prepared as follows. There were weighed out 2573.5 g of gadolinium oxide, 426.5 g of silicon dioxide, 23.6 g of cerium oxide and 0.0075 g of aluminum oxide followed by admixture of these ingredients together, firing of the resulting mixture at a temperature of 1200° C. and introduction of the fired mixture in an iridium crucible having a diameter of 100 mm. Then a single crystal was grown by the Czochralski method in which a seed crystal was pulled out of the melt of the raw materials under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a slightly pale yellow-colored single crystal was obtained and it had a diameter of 50 mm. In addition, the Al concentration in the single crystal thus prepared was determined by the inductively coupled plasma (ICP) mass spectrometry and as a result, it was found to be 0.6 ppm.

EXAMPLE C5

A gadolinium silicate single crystal having a Ce concentration of 1.93 mole % was prepared as follows. There were weighed out 2573.5 g of gadolinium oxide, 426.5 g of silicon dioxide, 23.6 g of cerium oxide and 0.15 g of aluminum oxide followed by admixture of these ingredients together, firing of the resulting mixture at a temperature of 1200° C. and introduction of the fired mixture in an iridium crucible having a diameter of 100 mm. Then a single crystal was grown by the Czochralski method in which a seed crystal was pulled out of the melt of the raw materials under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a colorless, transparent single crystal was obtained and it had a diameter of 50 mm. In addition, the Al concentration in the single crystal thus prepared was determined by the inductively coupled plasma (ICP) mass spectrometry and as a result, it was found to be 12 ppm.

EXAMPLE C6

A gadolinium silicate single crystal having a Ce concentration of 1.93 mole % was prepared as follows. There were weighed out 2573.5 g of gadolinium oxide, 426.5 g of silicon dioxide, 23.6 g of cerium oxide and 0.5625 g of aluminum oxide followed by admixture of these ingredients together, firing of the resulting mixture at a temperature of 1200° C. and introduction of the fired mixture in an iridium crucible having a diameter of 100 mm. Then a single crystal was grown by the Czochralski method in which a seed crystal was pulled out of the melt of the raw materials under the following crystal growth conditions: a temperature of the melt of 1950° C., a rotational number of the seed crystal of 30 rpm and a pulling rate of 2 mm/hr and the pulling operation was continued till 80% by mass of the raw material was crystallized. Thus, a colorless, transparent single crystal was obtained and it had a diameter of 50 mm. In addition, the Al concentration in the single crystal thus prepared was determined by the inductively coupled plasma (ICP) mass spectrometry and as a result, it was found to be 45 ppm.

COMPARATIVE EXAMPLES C

Comparative Examples C will hereunder be described while taking a cerium- doped gadolinium silicate single crystal (Ce: $Gd_2SiO_5$) by way of example like the foregoing Examples. Single crystals were grown according to the Czochralski method using, as raw materials, gadolinium oxide ($Gd_2O_3$, 99.99% by mass), silicon dioxide ($SiO_2$, 99.99% by mass) and cerium oxide ($CeO_2$, 99.99% by mass), which were completely identical to those used in the foregoing Examples (the purification lot numbers were also identical). A specimen having a size of $10\times10\times10$ mm$^3$ was taken from each single crystal thus prepared and the light transmittance thereof was determined at a wavelength of 450 nm. Moreover, the appearance of each single crystal was visually observed. The results thus obtained are summarized in the following Table 3. In each Comparative Example, three single crystals were grown and in Table 3, each datum was thus the average of three measurements.

COMPARATIVE EXAMPLE C1

A gadolinium silicate single crystal having a Ce concentration of 1.45 mole % was prepared as follows. There were weighed out 2573.5 g of gadolinium oxide, 426.5 g of silicon dioxide and 17.7 g of cerium oxide followed by admixture of these ingredients together, firing of the resulting mixture at a temperature of 1200° C. and introduction of the fired mixture in an iridium crucible. Then a single crystal was grown by repeating the same procedures used in Example C1. Thus, a strongly pale yellow-colored single crystal was obtained. In addition, the Al concentration in the single crystal thus prepared was determined by the inductively coupled plasma (ICP) mass spectrometry and as a result, it was found to be 0 ppm.

COMPARATIVE EXAMPLE C2

A gadolinium silicate single crystal having a Ce concentration of 1.45 mole % was prepared as follows. There were weighed out 2573.5 g of gadolinium oxide, 426.5 g of silicon dioxide, 17.7 g of cerium oxide and 0.0025 g of aluminum oxide followed by admixture of these ingredients together, firing of the resulting mixture at a temperature of 1200° C. and introduction of the fired mixture in an iridium crucible. Then a single crystal was prepared by repeating the same procedures used in Example C1. Thus, a strongly pale yellow-colored single crystal was obtained. In addition, the Al concentration in the single crystal thus prepared was determined by the inductively coupled plasma (ICP) mass spectrometry and as a result, it was found to be 0.2 ppm.

COMPARATIVE EXAMPLE C3

A gadolinium silicate single crystal having a Ce concentration of 1.45 mole % was prepared as follows. There were weighed out 2573.5 g of gadolinium oxide, 426.5 g of silicon dioxide, 17.7 g of cerium oxide and 0.65 g of aluminum oxide followed by admixture of these ingredients together, firing of the resulting mixture at a temperature of 1200° C. and introduction of the fired mixture in an iridium crucible. Then a single crystal was prepared by repeating the same procedures used in Example C1. As a result, it was found that the resulting single crystal contained a large number of voids therein. In addition, the Al concentration in the single crystal thus prepared was determined by the inductively coupled plasma (ICP) mass spectrometry and as a result, it was found to be 52 ppm.

COMPARATIVE EXAMPLE C4

A gadolinium silicate single crystal having a Ce concentration of 1.45 mole % was prepared as follows. There were weighed out 2573.5 g of gadolinium oxide, 426.5 g of silicon dioxide, 17.7 g of cerium oxide and 0.875 g of aluminum oxide followed by admixture of these ingredients together, firing of the resulting mixture at a temperature of 1200° C. and introduction of the fired mixture in an iridium crucible. Then a single crystal was prepared by repeating the same procedures used in Example C1. As a result, it was found that the resulting single crystal contained a large number of voids therein. In addition, the Al concentration in the single crystal thus prepared was determined by the inductively coupled plasma (ICP) mass spectrometry and as a result, it was found to be 70 ppm.

COMPARATIVE EXAMPLE C5

A gadolinium silicate single crystal having a Ce concentration of 1.93 mole % was prepared as follows. There were weighed out 2573.5 g of gadolinium oxide, 426.5 g of silicon dioxide and 23.6 g of cerium oxide followed by admixture of these ingredients together, firing of the resulting mixture at a temperature of 1200° C. and introduction of the fired mixture in an iridium crucible. Then a single crystal was prepared by repeating the same procedures used in Example C4. Thus, a strongly pale yellow-colored single crystal was obtained. In addition, the Al concentration in the single crystal thus prepared was determined by the inductively coupled plasma (ICP) mass spectrometry and as a result, it was found to be 0 ppm.

COMPARATIVE EXAMPLE C6

A gadolinium silicate single crystal having a Ce concentration of 1.93 mole % was prepared as follows. There were weighed out 2573.5 g of gadolinium oxide, 426.5 g of silicon dioxide, 23.6 g of cerium oxide and 0.0025 g of aluminum oxide followed by admixture of these ingredients together, firing of the resulting mixture at a temperature of 1200° C. and introduction of the fired mixture in an iridium crucible. Then a single crystal was prepared by repeating the same procedures used in Example C4. Thus, a strongly pale yellow-colored single crystal was obtained. In addition, the Al concentration in the single crystal thus prepared was determined by the inductively coupled plasma (ICP) mass spectrometry and as a result, it was found to be 0.3 ppm.

COMPARATIVE EXAMPLE C7

A gadolinium silicate single crystal having a Ce concentration of 1.93 mole % was prepared as follows. There were weighed out 2573.5 g of gadolinium oxide, 426.5 g of silicon dioxide, 23.6 g of cerium oxide and 0.65 g of aluminum oxide followed by admixture of these ingredients together, firing of the resulting mixture at a temperature of 1200° C. and introduction of the fired mixture in an iridium crucible. Then a single crystal was prepared by repeating the same procedures used in Example C4. As a result, it was found that the resulting single crystal contained a large number of voids therein. In addition, the Al concentration in the single crystal thus prepared was determined by the inductively coupled plasma (ICP) mass spectrometry and as a result, it was found to be 53 ppm.

COMPARATIVE EXAMPLE C8

A gadolinium silicate single crystal having a Ce concentration of 1.93 mole % was prepared as follows. There were weighed out 2573.5 g of gadolinium oxide, 426.5 g of silicon dioxide, 23.6 g of cerium oxide and 0.875 g of aluminum oxide followed by admixture of these ingredients together, firing of the resulting mixture at a temperature of 1200° C. and introduction of the fired mixture in an iridium crucible. Then a single crystal was prepared by repeating the same procedures used in Example C4. As a result, it was found that the resulting single crystal contained a large number of voids therein. In addition, the Al concentration in the single crystal thus prepared was determined by the inductively coupled plasma (ICP) mass spectrometry and as a result, it was found to be 69 ppm.

TABLE 3

| Items | Ce Conc. (mole %) | Al Conc. (ppm) | Transmittance (%) at 450 nm | Appearance |
| --- | --- | --- | --- | --- |
| Ex. C1 | 1.45 | 0.5 | 78 | Weakly pale yellow-colored |
| Ex. C2 | | 14 | 81 | Colorless, transparent |
| Ex. C3 | | 47 | 77 | Colorless, transparent |
| Ex. C4 | 1.93 | 0.6 | 75 | Weakly pale yellow-colored |
| Ex. C5 | | 12 | 78 | Colorless, transparent |
| Ex. C6 | | 45 | 75 | Colorless, transparent |
| Comp. Ex. C1 | 1.45 | 0 | 68 | Strongly pale yellow-colored |
| Comp. Ex. C2 | | 0.2 | 72 | Strongly pale yellow-colored |
| Comp. Ex. C3 | | 52 | 64 | Generation of voids |
| Comp. Ex. C4 | | 70 | 50 | Generation of voids |
| Comp. Ex. C5 | 1.93 | 0 | 66 | Strongly pale yellow-colored |
| Comp. Ex. C6 | | 0.3 | 70 | Strongly pale yellow-colored |
| Comp. Ex. C7 | | 53 | 61 | Generation of voids |
| Comp. Ex. C8 | | 69 | 50 | Generation of voids |

As will be clear from the data obtained in Comparative Examples C1 and C5, the resulting single crystal is strongly pale yellow-colored and the light transmittance of the single crystal is reduced as the Ce concentration therein increases. On the other hand, in Examples C1 to C6 in which Al is incorporated into the single crystal having a high Ce concentration, in an amount of higher than 0.4 ppm and not more than 50 ppm, the resulting single crystals have high light transmittances as determined at 450 nm and the degree of coloration thereof is quite low. Contrary to this, in Comparative Examples in which the Al content is not more than 0.4 ppm or exceeds 50 ppm, the light transmittances of the resulting single crystals are low and the single crystals are strongly colored when the Al content is too low, while if the Al content is too high, voids are generated in the resulting single crystals and the light transmittances thereof are thus considerably reduced.

Thus, the data listed in the foregoing Table 3 clearly indicate that the single crystal of the present invention can show the intended effects of the present invention or the single crystal is not significantly pigmented and it has a high light transmittance, while ensuring a short fluorescence-attenuation time observed when the single crystal is used as a scintillator.

The present invention provides a single crystal of a silicate of a rare earth element in which the slowly attenuating component (Slow Component) is reduced and the fluorescence-attenuation time is shortened.

The present invention provides a single crystal of a silicate of a rare earth element, which is scarcely colored even in a Ce concentration range higher than that used in the conventional technique or at a Ce concentration, which may entrain the coloration of the resulting single crystal in pale yellow, which permits the reduction of the fluorescence-attenuation time and which can contribute to the improvement of the resulting scintillator for PET in the operating speed.

What is claimed is:

1. A single crystal of a silicate of a rare earth element wherein the crystal contains aluminum in an amount of higher than 0.4 ppm and not more than 50 ppm and/or iron in an amount of higher than 0.1 ppm and not more than 50 ppm.

2. The single crystal of a silicate of a rare earth element of claim 1, wherein the crystal contains cerium in an amount of not less than 0.6 mole % and not more than 5 mole % and that it has a light transmittance, as determined at a wavelength of 450 nm, of not less than 75%.

3. The single crystal of a silicate of a rare earth element of claim 1 or 2, wherein the crystal contains aluminum in an amount of higher than 0.4 ppm and not more than 50 ppm.

4. The single crystal of a silicate of a rare earth element of claim 1 or 2, wherein the crystal contains iron in an amount of higher than 0.1 ppm and not more than 50 ppm.

5. The single crystal of claim 1 or 2, wherein the rare earth element is gadolinium.

6. The single crystal of claim 1 or 2, wherein the crystal is cerium-doped gadolinium silicate.

7. A scintillator which comprises the single crystal of claim 1 or 2.

* * * * *